June 13, 1961  H. HESKY  2,988,428
METHOD FOR REDUCING THE DEUTERIUM CONCENTRATION OF THE RESIDUAL
MOISTURE ADHERING TO A PULVERULENT CATALYST SUBSTANCE AFTER
FILTRATION OF A CATALYST SUSPENSION
THROUGH THE FILTER CAKE
Filed Aug. 19, 1958
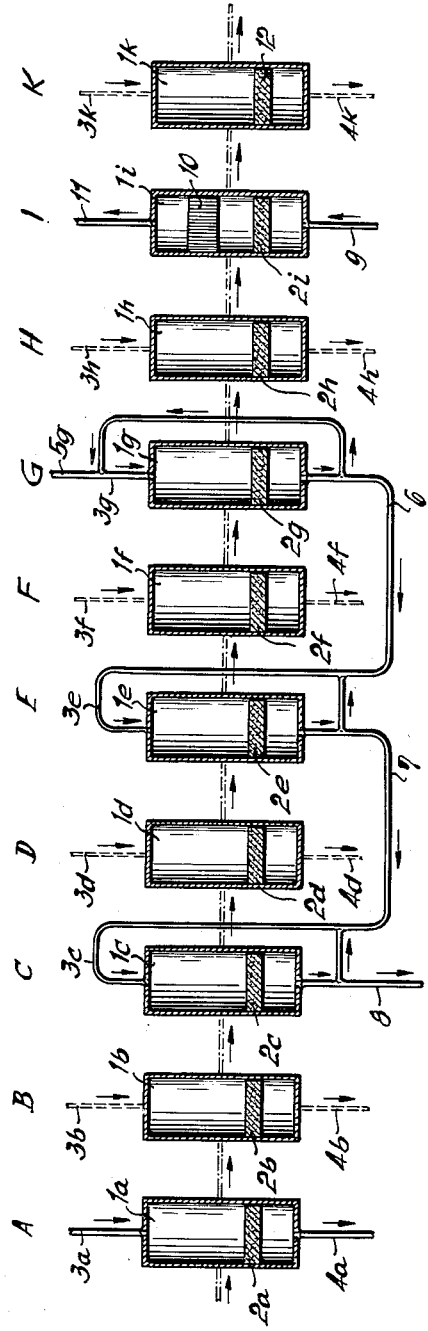
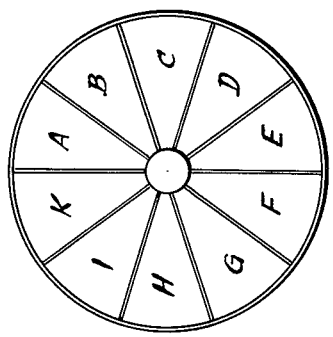
HANS HESKY
INVENTOR
BY
ATTORNEY United States Patent Office 2,988,428
Patented June 13, 1961

2,988,428
METHOD FOR REDUCING THE DEUTERIUM CONCENTRATION OF THE RESIDUAL MOISTURE ADHERING TO A PULVERULENT CATALYST SUBSTANCE AFTER FILTRATION OF A CATALYST SUSPENSION THROUGH THE FILTER CAKE
Hans Hesky, 21 Battenbergerweg, Frankfurt am Main-Rodelheim, Germany
Filed Aug. 19, 1958, Ser. No. 755,910
Claims priority, application Germany Aug. 19, 1957
12 Claims. (Cl. 23—204)

This invention relates to a method of reducing the deuterium concentration of the residual moisture adhering to a pulverulent catalyst substance after filtration of a catalyst suspension through the filter cake. The method according to the invention is employed in a process for producing heavy water wherein water is brought into catalytic isotope exchange with hydrogen produced subsequently therefrom or, if required, also partially of other origin, a very finely divided catalyst contained in fluid water and entrained thereby being employed for the isotope exchange and feeding of the water into the hydrogen generating apparatus being effected by way of a separating device for the catalyst.

In this process it is vitally important that, after the exchange of isotopes has taken place, the catalyst substance be separated completely from the water supplied thereafter to the hydrogen generating apparatus in order to obviate losses of the very valuable catalyst substance. A further essential requirement in this process is that the catalyst substance separated from the water enriched with deuterium should carry at little deuterium as possible into the fresh water entering the isotope exchanger and with which the catalyst substance is again admixed because of residual moisture adhering to the latter.

This last-mentioned requirement is due to the fact that, in order to obtain as high a yield of deuterium as possible, the hydrogen leaving the deuterium recovery apparatus at the head of the isotope exchanger and applied to other uses must be as poor as possible in deuterium. This, again, is possible only if the fresh water entering at the head of the isotope exchanger and which is in isotope exchange at this point with the issuing hydrogen has as low a concentration of deuterium as possible. For this reason, it must be endeavoured to reduce the deuterium concentration of the moisture adhering to the catalyst substance as much as possible, so that the deuterium concentration of the fresh water entering the isotope exchanger is increased as little as possible by admixture of residual moisture adhering of necessity to the catalyst substance.

The invention has for its object to provide a method which meets these requirements and, to this end, while employing the filtration known per se of the catalyst substance through the filter cake, it proposes to cut off the supply of suspension to the filter after the extreme thickness of the filter cake has been reached in order then to blow a flushing of scavenging gas, which according to circumstances may also be hot if required through the filter cake for the purpose of drying the same in the same direction as the supply of catalyst suspension in order to avoid the development of dust and, thereafter, after the supply of gas has been cut off, to carry the catalyst substance back into the isotope exchanger by means of fresh water flowing in in the opposite direction.

In order, during the next filtering operation, to prevent the moisture of low and approximately natural deuterium concentration remaining in the filter unit reducing the higher deuterium concentration of the water entering the filter unit from the isotope exchanger and containing catalyst substance, it is advantageous, before any fresh admission of suspension to the filter, to blow the filter through once more with a gas, which may be hot if required.

If the improverishment of the deuterium-containing moisture adhering to the catalyst substance which can be obtained by this method is still not sufficient, then, as a particularly advantageous development of the invention, the drying by means of flushing gas may be followed by one or more flushings with water which is preferably circulated, blowing through with flushing gas being advantageously carried out after each flushing with water. This flushing gas is removed from the deuterium recovery apparatus at a suitable point and returned to this apparatus at a suitable point with the moisture absorbed by the catalyst substance, so that no deuterium contained in the moisture adhering to the catalyst substance is lost.

The flushing water being enriched with heavy water is likewise again conducted into the deuterium recovery apparatus, fresh water being supplied to at least one of the water flushing-circuits, preferably the last, the individual water flushing-circuits being connected to one another, preferably connected in series from the last to the first, and a quantity of water corresponding to the quantity of fresh water supplied being drawn off preferably from the first flushing circuit. Furthermore, it is ensured that no losses of deuterium whatsoever will occur, because the entire deuterium absorbed by the flushing water and the flushing gas and contained in the residual moisture adhering to the catalyst substance is returned to the deuterium recovery apparatus.

Preferably, the flushing water drawn off is introduced at that point of the isotope exchanger which is appropriate according to the concentration. However, it is also possible to introduce the flushing water directly into the hydrogen generating apparatus.

The method according to the invention is advantageously carried out by means of a filter divided into a plurality of units in which the individual units move through the various stages of treatment in succession and which is constructed, according to a particularly advantageous form of embodiment known per se, as a rotatable, cylindrical filter divided into sectors.

In the accompanying drawings:
FIGURE 1 is a diagrammatic illustration of the various successive treatment processes in the reduction of the deuterium concentration of the residual moisture of the filter cake, and
FIGURE 2 is a purely diagrammatic representation of a special form of embodiment of a filter according to the invention.

In FIGURE 1 the filtering of the catalyst suspension in a filter unit 1a through the filter cake 2a is indicated in stage A. The suspension enters the unit 1a through the pipe 3a. The clear liquid leaves the unit 1a through the pipe 4a.

After the extreme thickness of the filter cake has been reached, the unit 1a moves into position B and is here designated as 1b. In this position gas, which is preferably hot, is blown through the filter cake 2b by way of the pipe 3b and leaves the unit 1b through the pipe 4b.

In stage C flushing water is conducted in circuit through the unit 1c by way of the pipe 3c.

The unit then moves to stage D where flushing gas, which is preferably hot, is blown by way of the pipe 3d through the unit 1d and the filter cake 2d and leaves the unit 1d again through the pipe 4d.

In the next stage E flushing is again carried out with circulated water while in the following stage F a flushing gas, which is preferably hot, is again blown through.

Flushing is again carried out with clear water in the following stage G the flushing water circuit is connected to the fresh water supply pipe 5g and is connected by way of the pipe 6 to the circuit 3e in stage E. The circuit 3e in stage E is connected by way of the connecting pipe 7 to the circuit 3c of stage C, from which circuit the enriched flushing water is drawn off through the pipe 8 for introduction into the isotope exchanger or the hydrogen generating apparatus. In stage H flushing is again carried out with gas, preferably hot gas, and finally, in stage I, by introducing fresh water by way of the pipe 9, the catalyst substance 10 is returned to the isotope exchanger through the pipe 11. Stage K denotes a stage provided additionally, if required, in which, before admission is renewed, the filter element 12 is treated with gas, which is preferably hot, by way of the pipes 3k and 4k.

FIGURE 2 is a plan view of a filter comprising various filtering sectors. The respective treatments illustrated in FIGURE 1 take place in the sectors A, B, C, D, E, F, G, H, I, K.

The invention is naturally not limited to the forms of embodiment which have been herein described in detail and illustrated in the drawings but, on the contrary, numerous modifications are possible without departing from the fundamental idea thereof.

I claim:

1. In a method for producing heavy water wherein water and hydrogen are brought into catalytic isotope exchange with a finely divided catalyst in water, separating said catalyst from said water, and feeding said water into a hydrogen generator, the improvement which consists in separating said water substantially completely from said catalyst and avoiding dusting thereof, said improvement comprising forming a cake of said catalyst on a filter, passing a gas through said cake to dry the same, thereafter flowing fresh water through said cake in the opposite direction from said gas flow to suspend said catalyst in said water, and passing said suspension into said isotope exchange, whereby the content of deuterium in the recovered catalyst is minimized.

2. The method of claim 1, which further comprises the formation of said cake by passing said catalyst in water through a filter to form a thick cake, and thereafter passing said gas through said cake in the same direction.

3. The method of claim 1, which further comprises flushing the filter cake with water after blowing said flushing gas therethrough.

4. The method of claim 3, which further comprises blowing a flushing gas through the filter cake after the flushing with water.

5. The method of claim 1, which further comprises flushing the filter cake with circulated water after blowing said flushing gas therethrough, and subsequently blowing a hot flushing gas through the filter cake.

6. The method of claim 1, which further comprises repeatedly flushing the filter cake with water and supplying fresh water to at least one of the water flushing circuits, the individual water flushing circuits being connected to one another, and drawing off from the first flushing circuit a quantity of water corresponding to the quantity of fresh water supplied.

7. The method of claim 6, which further comprises introducing the drawn-off flushing water into the isotope exchanger.

8. The method of claim 7, which further comprises introducing the drawn-off flushing water into the isotope exchanger.

9. The method of claim 6, which further comprises supplying the drawn-off flushing water to a following hydrogen generating apparatus.

10. The method of claim 1, which further comprises removing said flushing gas at a suitable point and returning it to the deuterium recovery apparatus after the flushing operation.

11. The method of claim 1, which further comprises blowing the filter through with gas after said flowing in of fresh water to carry said catalyst substance back into the isotope exchanger and before any fresh admission of suspension to the filter.

12. The method of claim 6, which further comprises the flushing with gas at stages between the flushings with flushing water.

References Cited in the file of this patent

FOREIGN PATENTS 1,138,776   France _____ June 19, 1957